(12) United States Patent
Choi

(10) Patent No.: US 12,509,174 B2
(45) Date of Patent: Dec. 30, 2025

(54) EARWEAR BLINKER

(71) Applicant: Uin Choi, Fairfax, VA (US)

(72) Inventor: Uin Choi, Fairfax, VA (US)

( * ) Notice: Subject to any disclaimer, the term of this patent is extended or adjusted under 35 U.S.C. 154(b) by 0 days.

(21) Appl. No.: 19/019,601

(22) Filed: Jan. 14, 2025

(65) Prior Publication Data
US 2025/0242877 A1    Jul. 31, 2025

Related U.S. Application Data

(60) Provisional application No. 63/627,765, filed on Jan. 31, 2024.

(51) Int. Cl.
| | |
|---|---|
| *B62J 6/057* | (2020.01) |
| *A41D 20/00* | (2006.01) |
| *A42B 3/04* | (2006.01) |
| *B60Q 1/26* | (2006.01) |
| *B62J 6/165* | (2020.01) |
| *B62J 6/26* | (2020.01) |
| *F21V 33/00* | (2006.01) |

(52) U.S. Cl.
CPC ............. *B62J 6/057* (2020.02); *B62J 6/165* (2020.02); *B62J 6/26* (2020.02); *A41D 20/00* (2013.01); *A42B 3/0453* (2013.01); *B60Q 1/2673* (2013.01); *F21V 33/0008* (2013.01)

(58) Field of Classification Search
CPC .......... G08B 5/36; G08B 5/38; B60Q 1/2673; B60Q 1/2676; A41D 13/01; A41D 20/00; F21V 33/0008; A42B 3/0433; A42B 3/0453
See application file for complete search history.

(56) References Cited

U.S. PATENT DOCUMENTS

| | | | | |
|---|---|---|---|---|
| 4,862,331 A | * | 8/1989 | Hanabusa | A42B 3/044 |
| | | | | 362/389 |
| 6,982,633 B2 | * | 1/2006 | Burdick | B60Q 1/2676 |
| | | | | 340/432 |
| 2010/0207758 A1 | * | 8/2010 | Szeljack | A42B 3/0453 |
| | | | | 340/475 |

(Continued)

FOREIGN PATENT DOCUMENTS

| | | | | |
|---|---|---|---|---|
| KR | 20190068308 A | * | 6/2019 | ............. A61F 11/04 |
| KR | 20230128717 A | * | 9/2023 | ................ B62J 6/26 |

*Primary Examiner* — Alexander K Garlen
(74) *Attorney, Agent, or Firm* — NKL LAW; Jae Youn Kim

(57) ABSTRACT

Provided is a wearable traffic signal device, a blinker, which is configured to send traffic direction signals when a user is riding a micro-mobility. The device includes LEDs disposed in the main body of the blinker and signals may be sent through controlling the LEDs. The blinker makes it easy for other vehicles to identify the location of a person wearing it, thereby preventing traffic accidents, and sends signals in various situations. Therefore, it protects people, such as, drivers of personal transportation using bar handles like electric scooters, children as well as the elderly, and people with disabilities who ride wheelchairs, or people who jog or walk on the side of the road, from the risk of traffic accidents. Further, in the current situation where carbon neutrality is urgent, the signaling device can allow many people to use non-motorized transportation vehicles, such as, scooters, bicycles, and micro-mobilities more.

20 Claims, 9 Drawing Sheets

(56) References Cited

U.S. PATENT DOCUMENTS

2017/0276856 A1* 9/2017 Gagneux .............. G02B 6/001
2017/0309152 A1* 10/2017 Dinkins .............. G08B 21/043
2018/0271197 A1* 9/2018 Lane, II .................. F21L 4/02

* cited by examiner

< winged secondary LED board Blinker >
(attach / detach)

EARWEAR BLINKER

BACKGROUND OF THE INVENTION

The turn signal device (blinker) is a very crucial component in vehicles on the road. However, there is no suitable place to install the turn signal device on electric scooters and other micro-mobilities. And it can be considered a serious issue that micro-mobilities are gradually evolving into more convenient means of transportation, replacing cars, and experiencing a sharp increase in users.

SUMMARY OF THE INVENTION

The embodiments of the invention address this problem with a simple yet effective solution. The embodiments of the invention provide a reliable and clear traffic direction signaling device for electric scooters, bicycles, or micro-mobility devices where there is no suitable location or place to install a blinker or a traffic direction signaling device. Furthermore, it assists in the convenience and safety of its operation. The purpose of these embodiments of the invention is to enable other vehicles to easily determine the location of a person wearing the blinker and to facilitate sending traffic direction signals in various situations.

The embodiments of the invention include the following structure, in which lighting devices, for example, light emitting diodes (LEDs) are provided in a main body with earwear on both sides, and the LEDs are controlled to send traffic direction signals. The LEDs provided in the main body of the earwear blinker is used to send traffic direction signals. LEDs emit light through electric current. LED light may have various colors, and different colors may be emitted depending on the type of signals and LED light may be used for displaying sequential signals. The embodiments of the invention may have the following effects: to facilitate determining a location of a person wearing an earwear blinker and to send signals for emergency situations as well as traffic direction signals in various situations.

The exemplary embodiments of the invention, "earwear blinker", has the following key features. First, exemplary embodiments of the invention are designed to be worn on both ears for use. This provides sufficient height for the user's presence and the direction in which the user intends to travel to be clearly recognized by drivers of surrounding vehicles.

Second, the embodiments of the invention address the critical drawback of electric scooters or micro-mobilities, which lack a suitable location or place to install a traffic direction signal. It resolves this issue by utilizing the highest point on the user's body, the ears.

Third, the embodiments of the invention are lightweight, portable, and small yet excels in its role as a traffic direction signal device.

Fourth, another idea of the embodiments of the invention combines wireless earphones with a blinker, providing convenience by utilizing the functions of wireless earphones and smartphones to operate the blinker.

Fifth, exemplary embodiments of the invention enhance driving safety by allowing hands-free operation of a blinker while operating electric scooters and similar vehicles.

In one or more embodiments of the invention, the earwear blinker is ear-wearable and provides portability and user convenience;

In one or more embodiments of the invention, the earwear blinker can be worn at a high position, enabling other drivers to easy recognize traffic participants, such as those riding scooters, micro-mobility devices, or bicycles;

In another embodiment of the invention, the earwear blinker is designed to operate instantly through push (touch) buttons, hand gesture sensors, voice recognition/detection sensors, and integration with the smart phone's voice AI, providing safety assistance to users of electric scooters or micro-mobility devices. The user can manipulate the direction signals using voice commands, which offers even greater safety to the user;

In another embodiment of the invention, it may contribute to the carbon neutrality of our planet, enabling increased utilization of electric scooters, micro-mobility, and bicycles as transportation means; and In another embodiment of the invention, it may play a significant role in ensuring the safety of not only children and individuals using wheelchairs but also vulnerable road users, such as runners along roadsides, from traffic accidents.

According to an embodiment of this present invention, a wearable traffic signal device includes: a body having a first end and a second end, the first end suitable for being put on a first ear of a user and the second end suitable for being put on a second ear of the user; wherein the body includes: a first plurality of light emitting diodes (LEDs) disposed on a left side, a right side and a rear side of the body; a circuit board disposed in the body and including a circuit configured for an operation of the first plurality of LEDs; and a battery disposed in the body for supplying a power to the wearable traffic signal, wherein when the wearable traffic signal device is worn by a user, the body is configured to cover left, right and rear sides of a head of the user, each of the first end and the second end of the body has a shape suitable for being looped over each of the first and second ears, a power switch disposed at the body is connected to the circuit board and is configured to activate or deactivate the first plurality of LEDs, the first plurality of LEDs are configured to display a blink with a predetermined frequency level, when an instruction to a left direction is given, the first plurality of LEDs displays a sequential blinking to the left direction and a clicking sound is generated at the body, and when an instruction to a right direction is given, the first plurality of LEDs displays a sequential blinking to the right direction and the clicking sound is generated at the body.

According to an embodiment of the present application, the wearable traffic signal may include a strap for adjusting a length of the body.

According to an embodiment of the present application, the wearable traffic signal device may further include a push button disposed at each of the first and second ends of the body and configured to be pushed or pressed by the user to activate or deactivate the first plurality of LEDs, wherein the instruction to the left direction or the instruction to the right direction are given by pushing or pressing the push button.

According to an embodiment of the present application, the wearable traffic signal device may include: an ultrasonic sensor disposed at each of the first and second ends of the body and enabling the first plurality of LEDs to be activated or deactivated, wherein the instruction to the left direction or the instruction to the right direction are given by brushing the ultrasonic sensor or a periphery of the ultrasonic sensor.

According to an embodiment of the present application, the wearable traffic signal device may include: an orientation detection sensor disposed at each of the first and second ends of the body and configured to detect a movement or a tilt of the body, wherein the instruction to the left direction or the instruction to the right direction are given automatically according to the movement or the tilt of the body.

According to an embodiment of the present application, the wearable traffic signal device may include: a microphone disposed at each of the first and second ends of the body and configured to receive a voice command of the user; and a voice detector recognizing the voice command instructing the operation of the first plurality of the LEDs, wherein, when the microphone receives a left turn voice command, the left turn voice command is transmitted to the voice detector and the first plurality of LEDs sequentially blinks to the left, when the microphone receives a right turn voice command, the right turn voice command is transmitted to the voice detector and the first plurality of LEDs sequentially blinks to the right, when the microphone receives a stop voice command, the stop voice command is transmitted to the voice detector and the first plurality of LEDs displays a stop light, and when the microphone receives an emergency light voice command, the emergency lights voice command is transmitted to the voice detector and the first plurality of LEDs displays an emergency light.

According to an embodiment of the present application, the wearable traffic signal device may include: an attachable and detachable wireless earphones disposed at the first and second ends of the body and configured to communicate with the body, wherein each of the attachable and detachable wireless earphones include a microphone configured to receive a voice command of the user; a voice detector recognizing the voice command instructing the operation of the first plurality of the LEDs, wherein when the microphone receives a left turn voice command, the left turn voice command is transmitted to the voice detector and the first plurality of LEDs sequentially blinks to the left, when the microphone receives a right turn voice command, the right turn voice command is transmitted to the voice detector and the first plurality of LEDs sequentially blinks to the right, when the microphone receives a stop voice command, the stop voice command is transmitted to the voice detector and the first plurality of LEDs displays a stop light, when the microphone receives an emergency light voice command, the emergency lights voice command is transmitted to the voice detector and the first plurality of LEDs displays an emergency light, and the clicking sound is generated through the wireless earphones according to the voice command of the user.

According to an embodiment of the present application, the wireless earphones may be configured to be linked to a voice recognizing artificial intelligence (AI) application of a smartphone of the user, and thereby, the voice command may be given by the smartphone to the wearable traffic signal device and the wearable traffic signal device operates the first plurality of LEDs according to the voice command.

According to an embodiment of the present application, the voice command may include a power on command, a power off command, the left turn command, the right turn command, a driving command, the stop command and the emergency light command.

According to an embodiment of the present application, the wireless earphones may include a camera configured to record predetermined surroundings of the wearable traffic signal device.

According to an embodiment of the present application, the camera may include a pan-and-tilt head allowing a lens of the camera to be rotated and tilted According to an embodiment of the present application, the camera may be attachable to and detachable from the wireless earphones.

According to an embodiment of the present application, the wearable traffic signal device may include a camera and earphones, wherein the camera and the earphones are attachable to or detachable from the body.

According to an embodiment of the present application, the body may include a flexible LED board attachable to and detachable from the body, the flexible LED board may include a second plurality of LEDs, and the flexible LED may be configured to rotate with respect to a central axis of the body.

According to an embodiment of the present application, the body may include a global positioning system (GPS) receiver.

According to an embodiment of the present application, the body may include a speaker.

According to an embodiment of the present application, the wearable traffic signal device may include: a third plurality of LEDs disposed vertically on a front-facing surface at each of the first and second ends of the body.

According to an embodiment of the present application, the wearable traffic signal device may include: at least one earphone, a microphone and a camera mounted at an end of the microphone, wherein the microphone is attached at the at least one earphone.

According to an embodiment of the present application, wherein the camera includes a pan-and-tilt head allowing a lens of the camera to be rotated and tilted.

According to an embodiment of the present application, wherein the microphone is configured to receive a voice command of the user, and the wearable traffic signal device further includes a voice detector recognizing the voice command instructing operation of the first plurality of LEDs.

DETAILED DESCRIPTION OF EXEMPLARY EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, this sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Expressions in a singular form are to be understood as including a meaning of a plural form unless the context explicitly indicates otherwise, a term such as "comprising" or "including" is intended to designate the presence of characteristics, numbers, steps, operations, elements, parts, or combinations thereof that are implemented, and should not be understood to preclude any possibility of the presence or addition of one or more other characteristics, numbers, steps, operations, elements, parts, or combinations thereof.

According to an exemplary embodiment, and referring generally to the Figures, various exemplary implementations of an earwear blinker may be disclosed.

Figure 1:
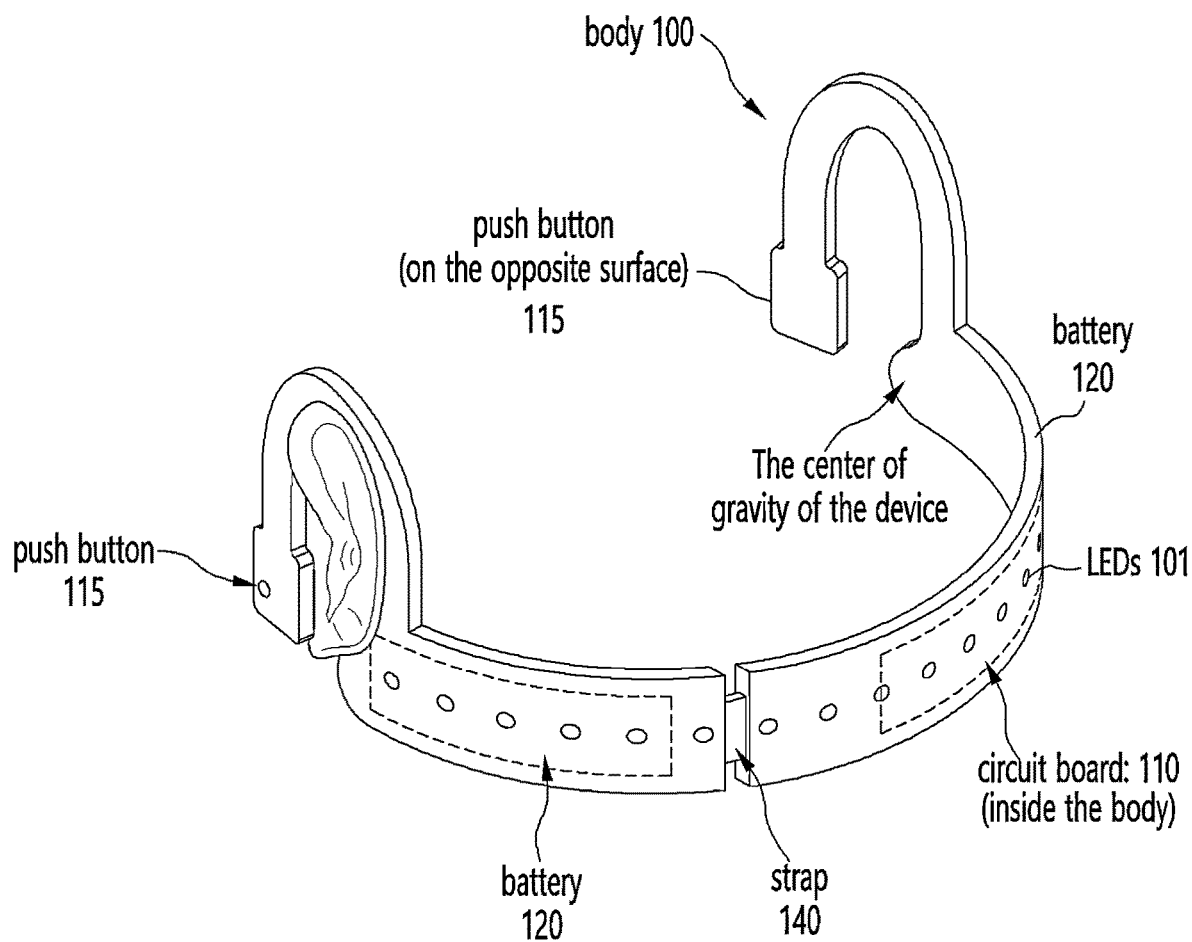
FIG. 1 shows an exemplary embodiment of an earwear blinker.
Figure 2:
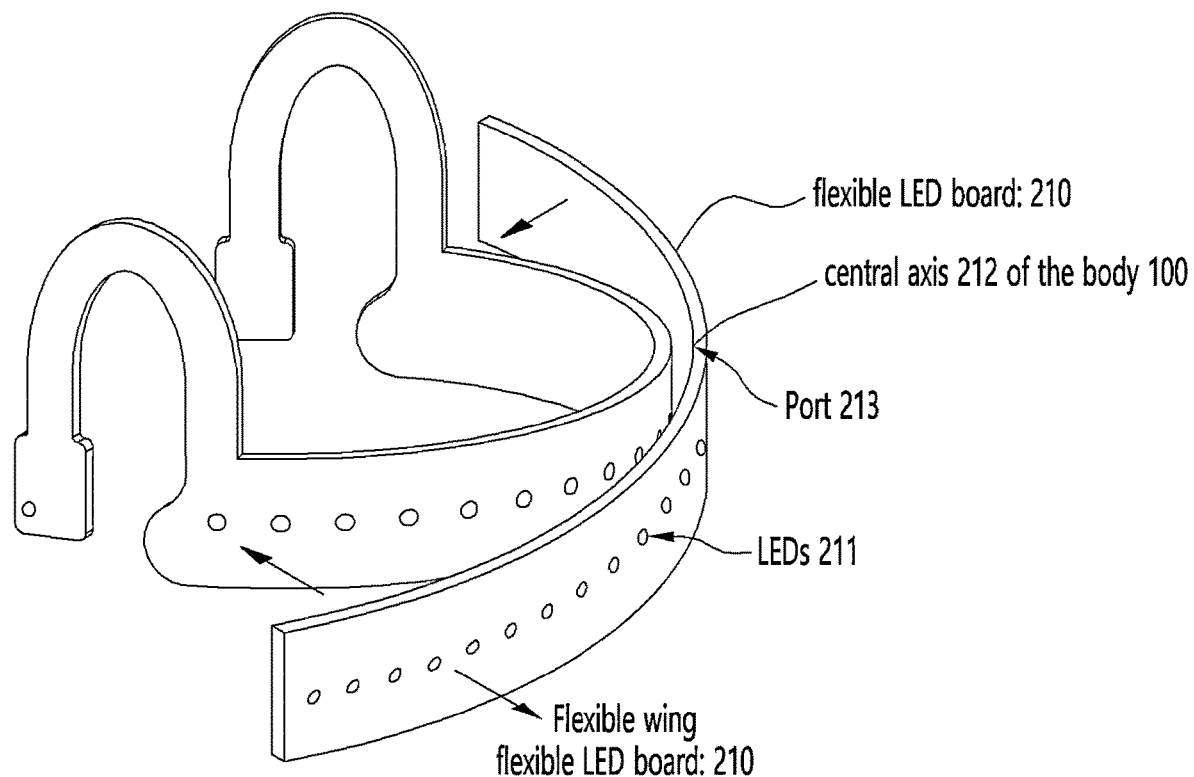
FIG. 2 shows another exemplary embodiment of an earwear blinker.

Referring now to FIG. 1, FIG. 1 shows an exemplary embodiment of an earwear blinker. According to this exemplary embodiment, the earwear blinker may include a power switch 130, and the blinker may include push buttons 115. Also, in an exemplary embodiment, a body 100 of the wearable traffic signal may have two or more ends, earwear push (touch) buttons 115, respectively, may be disposed on each end of the body 100, and the body 100 has a shape suitable for being put on an ear of the user such that the body 100 of the earwear blinker may be secured to the user's body. The power switch 130 may be disposed at a central portion of the body 100 as illustrated in FIG. 1.

Also, according to an exemplary embodiment, the earwear blinker may further include lightning devices 101, for example, Light Emitting Diodes (LED). LEDs 101, as an example, approximately twenty (20) in number, may light up when the power switch 130 is pressed (or touched) and the LEDs 101 may be disposed on a left side, a right side and a rear side of the body 100.

Referring still to FIG. 1, the body 100 of the earwear blinker may include the LEDs 101 arranged in a row for the role of the blinker and may simultaneously include a circuit board 110 (e.g., printed circuit board (PCB)) and a battery 120. Additionally, to counteract the device's heat generation, thermal pads and thermal grease may be installed within the board's internal space. The circuit board may include a processor and a memory, and when software instructions in the memory are executed by the processor, certain functions of the blinker can be activated with the push button 115. Also, the circuit board may include Application-specific integrated circuit (ASIC) where a certain circuitry for certain functions is fabricated in a semiconductor. The circuit board 110 may control brightness of the LEDs in response to actuation of a button disposed on the body.

Figure 4:
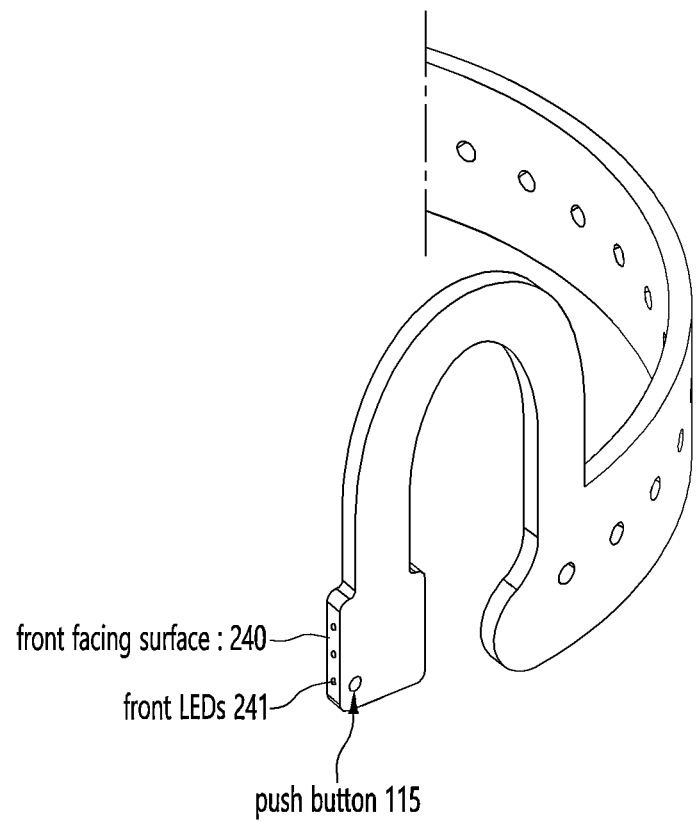
FIG. 4 shows a front LED bulb and a switch position according to an exemplary embodiment.
Figure 6:
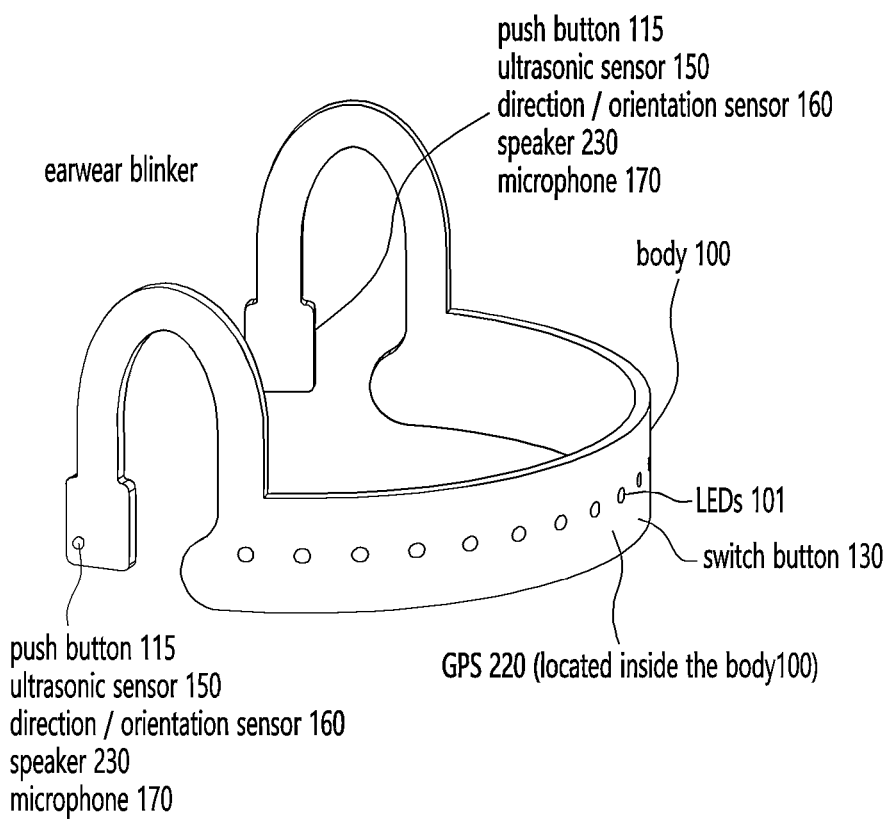
FIG. 6 is a diagram showing the location of a push button, an ultrasonic sensor, a direction/orientation sensor, a speaker, a microphone, GPS, and port according to an exemplary embodiment of the earwear blinker. The illustrated components can be placed on/in the earwear blinker individually or collectively.
Figure 7:
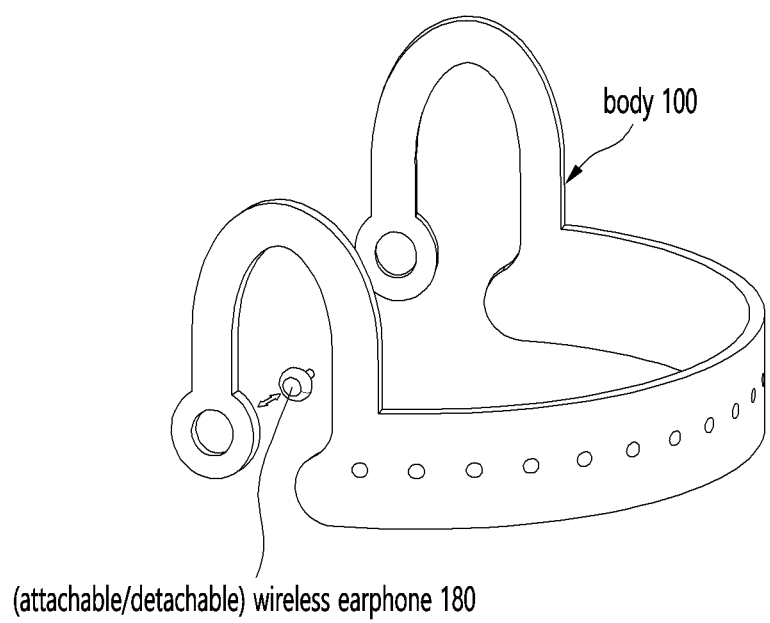
FIG. 7 is a diagram showing a wireless earphone 180 that can be attached to or detachable from the body 100 of the earwear blinker.
Figure 8:
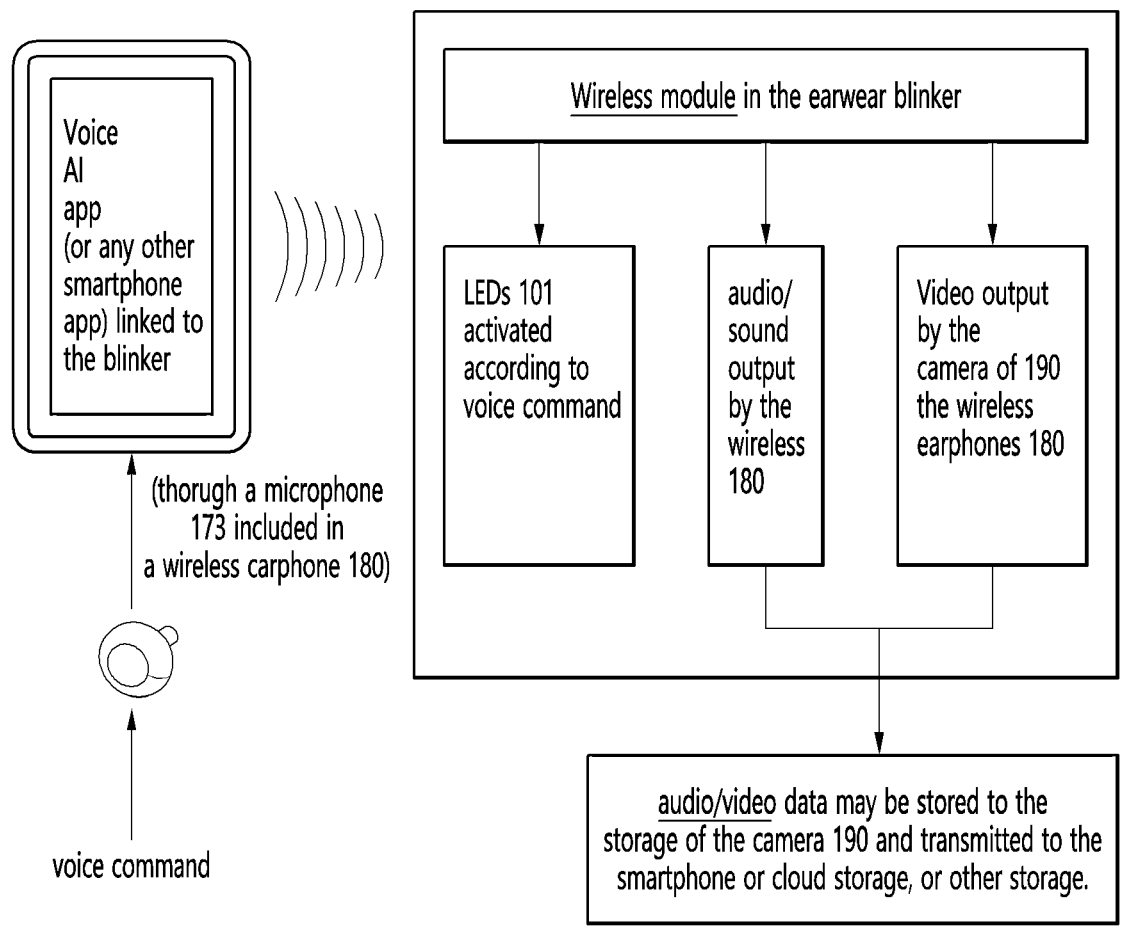
FIG. 8 is a schematic diagram showing a voice AI app linked to the blinker according to an exemplary embodiment. The voice AI app activating the earwear blinker of the earwear blinker is further illustrated.
Figure 9:
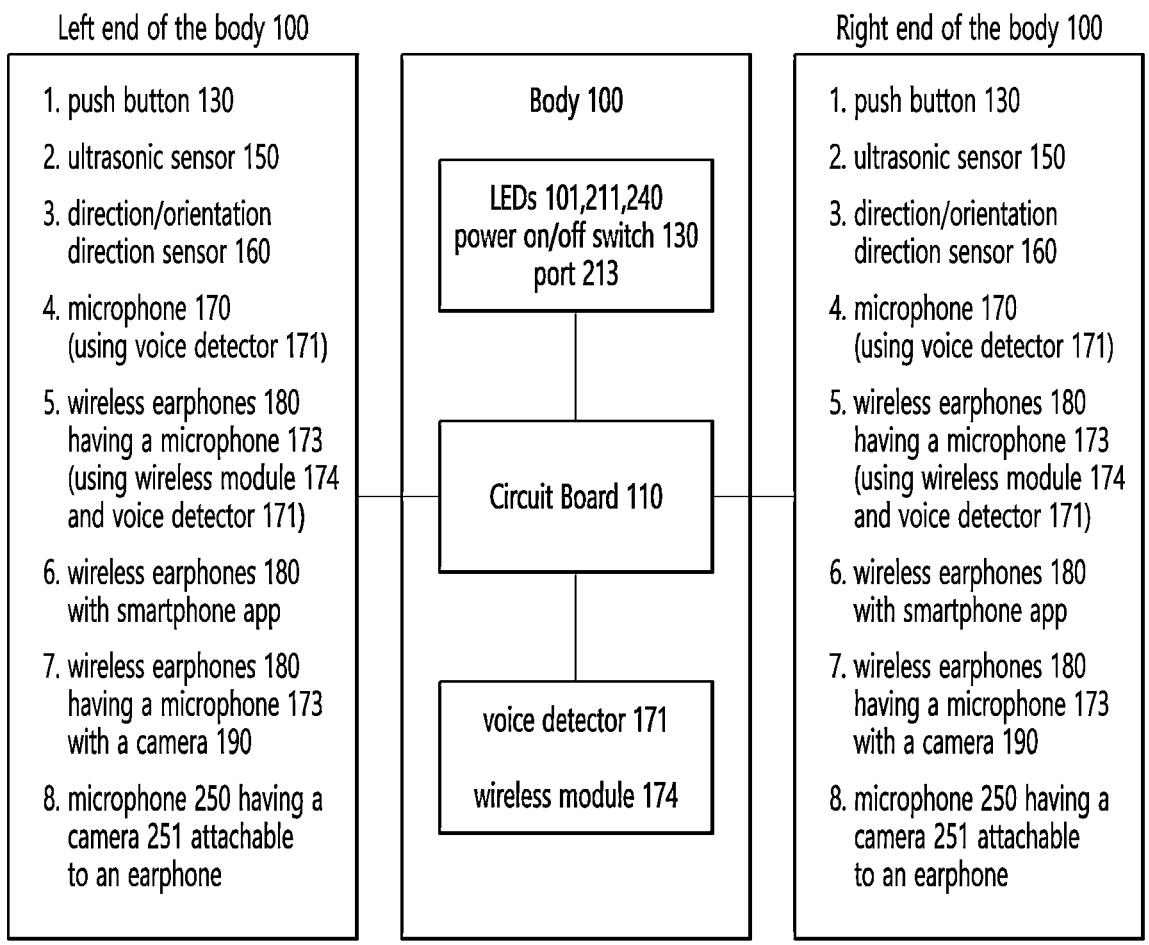
FIG. 9 is a schematic diagram showing a connection of a circuit board that can be in connection with components of the earwear blinker according to exemplary embodiments of the earwear blinker. The components illustrated in FIG. 8 can be connected to the circuit board individually or collectively.

Also, in an exemplary embodiment, the earwear blinker may further include the battery 120. The battery 120 may be a rechargeable battery supplying power to operate the blinker. The exemplary embodiment of the invention may be an earwear. Therefore, a strap 140 for adjusting the length of the main body 100 depending on the size of the user may be attached, making it suitable for use by various users. The LEDs 101 placed in the main body 100 may be located mainly at both left and right sides of the back of the main body 100. As an example, front-facing blinkers 241, approximately 3-4 in number, may be vertically disposed, as illustrated in FIG. 4, at a front-facing surface 240 located at each end of the earwear blinker in which each push button 115 is positioned. The earwear blinker may further include a global positioning system (GPS) receiver 220 and a speaker 230, as illustrated in FIGS. 6 and 8, in the body 100. Specifically, the speaker 230 may be disposed at each left and right side of the body 100.

The earwear blinker, in an exemplary embodiment of the invention, is designed to utilize the shape of an ear to hold it in place. In this embodiment of the invention, the earwear blinker may include the push button 115 and the body 100 of the earwear blinker that may be integrated into one component. The push button 115 may be placed at each of the right and left ends of the main body 100.

According to an exemplary embodiment, the product is the main body 100 of the earwear blinker may be positioned at the back of the user's head. Therefore, for the stability of the center of gravity, each push button 115 may be disposed to the front of each earhole of a user, when it is worn by a user, following the shape of the ear to the back and allowing the center of gravity to lean towards the back of the ear and securely fix itself.

According to an exemplary embodiment, when the power switch 130 is pressed for approximately 3 seconds, the power is turned on (available on both left and right sides), and at the same time, the LEDs 101 simultaneously display a slow blink to indicate that the blinker is in operation. Additionally, a clicking sound may be generated to inform that the blinker is functioning by pushing the push button 115. In an exemplary embodiment, pressing the push button 115 on the right or left side of the body 100 once may activate a sequential blinking mode where the LEDs 101 blink sequentially to the right for left. At this time, a small clicking sound may be generated from the push button 115 on the right or left side of the body 100 to indicate that it is functioning as per the command.

According to an exemplary embodiment, the LED operation mode of the earwear blinker may be sequential blinking. This is because the total length of the LED section, as an example, may be less than approximately 20-25 cm and forms a curved shape. This blinking method effectively compensates for the limited field of vision. Moreover, the sequential blinking provides a more distinct perception of the wearer's driving direction to oncoming vehicles compared to a conventional blinker. Also, in an exemplary embodiment, touching, pressing or tapping the right or left push button 115 quickly twice may change the LED operation mode to a driving light mode (e.g., slow blinking) along with a clicking sound in order to indicate that the blinker is functioning. Further, touching, pressing, or tapping of the right or left push button 115 quickly thrice may change the LED operation mode to a stopping light mode (e.g., LED light on without blinking). Further, touching, pressing, or tapping of the right or left push button 115 quickly four times may change the LED operation mode to an emergency light mode (e.g., fast blinking which is faster than the blinking in the driving light mode) along with a high-frequency clicking sound. Also, in an exemplary embodiment, when the power switch 130 is pressed for approximately 3 seconds, the power may be turned off.

According to an exemplary embodiment, the blinker may be worn in a manner similar to wearing glasses backward. Therefore, when the blinker is worn, the body 100 of the earwear blinker is located from the user's ears to the back of the user's neck. This means that the main scanning direction of the blinker may be the left, right, and back of the person wearing the earwear blinker. For the blinker for the front (direction), around three LEDs 241 may be arranged on the front surface 240 of each earwear portion in which the push button 115 is located. Each end of the main body 100 of the earwear blinker is configured to be held by each ear of the user.

According to an exemplary embodiment, the blinker may utilize the sequential blinking method. This is due to the short length and curved shape of the LEDs 101 on the main body 100. This blinking method effectively compensates for the limited field of vision, providing a clearer perception of the wearer's driving direction to other vehicles compared to a conventional blinker. Also, in an exemplary embodiment, when worn by a user, the blinker may be designed in a form that connects to both ears and the occiput of the wearer, positioning the blinker at an appropriate height considering the other driver's viewing height. Despite the shorter length of the LEDs 101 arranged on the main body 100, the blinker may ensure the clear and rapid communication of all blinker functions to oncoming traffic.

Considering that many accidents involving bicycles and micro-mobility devices may occur due to the lack of awareness by other drivers, it is expected that the invention may contribute to accident prevention.

Another exemplary embodiment may include an ultrasonic sensor 150. The ultrasonic sensor 150 can be provided at each of the left and right ends of the body 100 according to an exemplary embodiment. Also, in an exemplary embodiment, an ultrasonic sensor 150 may be further connected to the circuit board 110. The circuit board 110 including the ultrasonic sensor 150 may be programmed to execute blinker operations. The ultrasonic sensor 150 may be located at each left and right side of the body 100.

Operation and functionality of an exemplary embodiment with the ultrasonic sensor are described as follows. According to this exemplary embodiment of this invention, the blinker is an ear-wearable product, and thus, the ultrasonic sensor 150 may be positioned on both ears when the user wears the blinker. Also, in an exemplary embodiment, the user may power on the ear-wearable blinker by pressing the power switch 130. For example, lightly touching the ultrasonic sensor 150 located on the left side of the body 100 may cause the LEDs 101 into a "sequential blinking" state to the left direction. During this state, a small "clicking sound" may be generated from a speaker 230 located near to the left ear. In a similar way, lightly touching the ultrasonic sensor 150 on the right side of the body 100 may cause the LEDs 101 into a "sequential blinking" state to the right direction, and a small "clicking sound" from a speaker 230 may be generated located near to the right ear of the user. Further in an exemplary embodiment, the earwear blinker may be turned off by pressing the ultrasonic sensor 150 at the power switch.

Effects of an exemplary embodiment with the ultrasonic sensor are described as follows. According to an exemplary embodiment in which the push button 115 is provided but an ultrasonic sensor 150 is not included, and the push button 115 may cause a slightly delayed activation after pressing or touching the push button 115. Moreover, in urgent situations, the user might fail to press or touch the push button 115. In contrast, the ultrasonic sensor 150 may indicate the direction of the blinker when the user momentarily brushes the ultrasonic sensor 150 which is disposed at which the push button 115 can be provided. Therefore, efficient ways of signal directions can be provided in micro-mobility environments.

Another exemplary embodiment including a voice detection sensor is described as follows. According to an exemplary embodiment, a voice detector 171 may be further included, and a microphone 170 can be provided at which the push button 115 can be provided. The voice detector 171 may be replaced by a voice detection sensor or a voice recognition module. Also, in an exemplary embodiment, the microphone 170 may be a pin microphone, which is attachable and/or detachable, for accurate transmitting of voice commands in noisy environments. The voice detector 171 may be used for recognizing the voice commands instructing the operation of the LEDs 101, and the microphone 170 may be used for inputting the voice command transmitting the voice command to the voice detector 171. Further, the voice detector 171 can be provided at and/or connected to the circuit board 110 which includes a CPU and a memory which includes software instructions and, when executed by the CPU, detects voice commands for the blinker operation.

Operation/functionality of an exemplary embodiment with the voice detection sensor is described as follows. According to an exemplary embodiment of the invention, the microphone 170 can be provided at which the push button 115 can be provided, allowing it to operate according to voice commands. The microphone 170 may be used to cleanly transmit voice commands in noisy environments. Also, in an exemplary embodiment, when the power is on, the LEDs 101 may operate in a "slow blinking" mode, indicating the operation of the earwear blinker. Further, according to an exemplary embodiment, following the programmed software instructions, upon receiving the voice command "right (or left)" or "right (or left) turn", the LEDs 101 enter a "sequential blinking" mode to the right (or left) direction. During this state, a small "clicking sound" may be generated from the speakers 230 near to ears of the user, allowing the user to perceive the direction indicated by the voice command.

Therefore, the earwear blinker, as effects of an exemplary embodiment with the voice detection sensor, may prevent accidents from happening to drivers of micro-mobilities. The blinker operated by voice commands may prevent drivers of an electric scooter, bicycle or any micro-mobility from taking their hands off the handlebars.

Another exemplary embodiment including a direction/orientation detection sensor is described as follows. According to an exemplary embodiment, the blinker includes a direction/orientation detection sensor 160 such that a function to detect the direction or orientation of the blinker may be further provided. Further, according to an exemplary embodiment, this function may automatically adjust the display direction of the LEDs 101 or may automatically display a specific signal when the body 100 of the blinker is tilted in a certain direction. The direction/orientation detection sensor 160 can be disposed at each of the left and right ends of the body 100.

Operation/functionality of an exemplary embodiment with the direction/orientation detection sensor is further described as follows. According to an exemplary embodiment, the direction/orientation sensor 160 may be further provided to detect the direction, movement and/or tilt of the body 100 of the blinker, and after the detection, the detection data may be transmitted to the circuit board, and the circuit board, including a direction detection circuit or module, may analyze the data to determine the current direction of the body. Further, according to an exemplary embodiment, depending on the orientation of the body 100, the LED display direction may be adjusted, or a specific signal may be displayed.

Effects of an exemplary embodiment with the direction/orientation detection sensor is further described as follows. The direction/orientation detection sensor 160 may allow drivers of electric scooters, bicycles, or micro mobilities to show the direction which the driver is heading to. Further, the direction/orientation detection sensor 160 may allow signals to be automatically displayed without driver's hand movements. Accordingly, safety of night driving can be improved.

Figure 3:
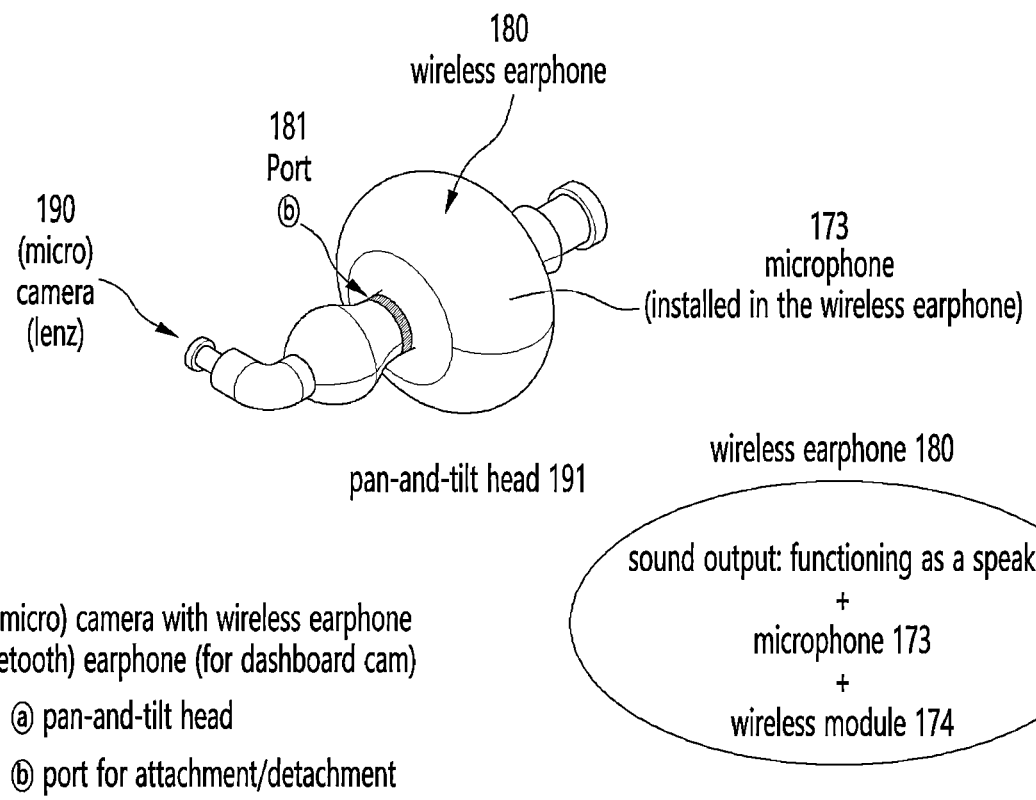
FIG. 3 shows a micro camera with a wireless earphone according to an exemplary embodiment.

Another exemplary embodiment including wireless earphones for voice commands is described as follows. Referring now to FIG. 3, FIG. 3 shows a micro camera with a wireless earphone according to an exemplary embodiment. According to an exemplary embodiment, wireless earphones 180, which is detachable from and attachable to the body 100 of the earwear blinker, can be provided at which the push button 115 can be provided. In an exemplary embodiment, a microphone 173 (e.g., pin microphone, a wireless microphone) may be further provided to the wireless earphones 180 to accurately transmit voice commands. As the wireless earphones 180 outputs a sound, the earphones 180 can function as a speaker 230 according to other embodiments of the present application.

Further, a voice detector 171 for communication between wireless earphones 180 and the main body 100 of the blinker can be provided according to an exemplary embodiment of the invention. The voice detector 171 may include a voice detection sensor and a voice recognition module. The voice detector 171 can be provided to recognize the voice transmitted from the microphone 173 of the wireless earphones 180 and to instruct the operation of the blinker. The voice detector 171 may be placed in the body 100, by which the wireless earphones 180 are connected to the LEDs of the earwear blinker such that the voice commands may be transmitted through the wireless earphones 180.

Operation/functionality of exemplary embodiments with the wireless earphone-based voice command is described as follows. According to an exemplary embodiment, a wireless module 174 (e.g., a Bluetooth module) may be installed on the circuit board 110 and may be programmed for connecting wireless earphones 180 that include a microphone 173 which may be a built-in microphone and/or an attachable/detachable microphone (e.g., PIN Microphone). According to an exemplary embodiment, if the power switch 130 is pressed for 2-3 seconds while the earwear blinker is off, the earwear blinker may be activated, LEDs 101 may be operated, and the driving mode may be on with "slow blink" _According to an exemplary embodiment, if a voice "left (right) turn" is transmitted from the microphone 173 to the voice detector 171, the LEDs 101 may "blink sequentially" to the left (or right) direction. If the power switch 130 of the body 100 is pressed for 2-3 seconds while the power of the earwear blinker is on, the earwear blinker may be turned off.

Effects of an exemplary embodiment with the wireless earphone-based voice command are described as follows. Wireless earphone-based voice command is a function that has evolved one step beyond the function of a voice sensor. The blinker may be operated by connecting the wireless earphones 180 with the wireless module (174) installed on the circuit board 110. The accuracy of voice recognition through the wireless earphones 180 including the microphone 173 may be better than the voice recognition through a microphone to be attached on the push button 115 of the body 100, and thus, the blinker can be operated effectively, and the blinker having the wireless module 174 may consume less battery than the blinker having a voice recognition module electrically-wired to the body 100 of the earwear blinker. Also, by using the wireless earphones 180, the driver can operate the blinker without taking their hands off the handlebars. This can be an advantage for safety, as the wireless earphones 180 with the wireless voice recognition module allow the driver to maintain control of the vehicle while signaling a turn. This exemplary embodiment of the invention may be more convenient than the previous exemplary embodiments, as the driver does not need to remember a specific button or phrase to operate the blinker. The driver can speak the name of the direction they want to turn, and the blinker may operate accordingly.

Another exemplary embodiment including wireless earphones, and smartphone voice artificial intelligence (AI) is described as below. According to an exemplary embodiment, the earwear blinker may be further connected to a voice AI app installed on the user's smartphone, and commands may be set through the AI app to control the blinker. The commands may include "left turn", "right turn", "driving", "stop", etc. According to an exemplary embodiment, a wireless module 174 for connecting the earwear blinker to a smartphone may be further installed in the blinker circuit board 110.

Operation and functionality of an exemplary embodiment with the wireless earphones, and smartphone voice AI are described as follows. According to an exemplary embodiment, wireless earphones and smartphone may be paired (the paring may be made via Bluetooth), such that when the blinker's name is called, and then "power on" is said by the user, the power of the blinker may turn on, and the LEDs 101 may operate in the driving mode with a slow blinking. Alternatively, the user may set the "turn on" instead of "power on", but the voice commands are not limited thereto. Further, according to the embodiment, voice commands can be used to control the blinker with the voice recognition AI app, such as, "power on", "power off", "left turn", "right turn", "driving", "stop", and "emergency lights". However, the user may further set voice commands as desired by the user. If the user says "left (or right) turn" in voice, the voice may be recognized by the voice AI of the user's smartphone through an input unit of the smartphone. Further, the command may be transmitted to the blinker and the "left (or right) turn" mode can be operated. Further, according to an embodiment, the user may name the voice recognition AI app (application) of the earwear blinker, and if the user calls the name of the blinker by voice, and the user says, "power off", the power of the blinker may turn off.

Effects of an exemplary embodiment with the wireless earphones, smartphone voice AI, and smartphone app are described herein as follows. Wireless earphones 180 and the voice command system of the blinker can allow a driver to operate the blinker without using their hands while driving. Thus, the convenience of driving micro mobilities and other vehicles can be improved. If the driver is required to operate the blinker manually, the driver may have to take their eyes off the road while driving. The voice command system may reduce the driver's amount of time taking their eyes off the road while driving, which can enhance the driving safety. Also, with the voice command system, the driver can pick up incoming calls without using their hands, which can also contribute the driving safety.

An exemplary embodiment with wireless earphones with a camera, smartphone voice AI, and smartphone app is described as below. Referring to FIG. 3 which shows a micro camera with a wireless earphone according to an exemplary embodiment, a camera 190 may be further provided in addition to the microphone 170. The camera 190 may include a micro camera or spy camera which is used as a dashcam to record the driver's surroundings while driving. In an embodiment, the camera 190 may be attached to the wireless earphones 180 using a pan-and-tilt head 191, which allows lens of the camera 190 to be rotated and tilted to provide a wider field of view.

Further, according to an exemplary embodiment, video data of the camera 190 may be sent to the smartphone via the wireless module 174, and the smartphone app may allow the driver to view the video in real time and save it to the smartphone's storage or cloud storage. In an exemplary embodiment, the size of the camera 190 may be adjusted or minimized by applying the pan-and-tilt head 191 to the wireless earphones 180 so that only the lens of the camera 190 may be positioned in view of the user.

In an exemplary embodiment, an earwear blinker app for operating with a smartphone may be used with the blinker. Further, a wireless module 174 connecting the wireless earphones 180 to the smartphone voice AI and/or any smartphone app may be further included. The wireless module 174 may be used for receiving and transmitting audio and/or video data between the wireless earphones 180 and the smartphone voice AI and/or any of smartphone apps. Also, in an exemplary embodiment, the blinker may further include a video storage to allow video data transmitted from the camera 190 of the earphones 180 to be directly shared in the user's smartphone storage and cloud storage.

Operation and functionality of an exemplary embodiment with wireless earphones, camera, smartphone voice AI, and smartphone app are described as below. The camera 190 can be used to record the driver's surroundings, including other vehicles, pedestrians, and/or traffic signs. Further, when the user activates the earwear blinker app installed on the smartphone, the voice AI may be configured to be activated at the same time. Further, when the user calls the name of the blinker, and the user says, "power on", the blinker may turn on, and the blinker may operate in driving mode at the same time. Further, when the power is turned on, the camera 190 may start recording immediately. The video may be stored in the designated memory on the smartphone, and/or the user can also watch it live through the video window of the smartphone app or can watch the recorded video.

Further, the microphone 173 may be included in the earphones 180, and the blinker may recognize the voice commands of "driving mode," "left (or right) turn", "stop", and "emergency lights" through the microphone 170, and may perform each mode. Further, when the user calls the name of the blinker that is set, and says "power off", the power of the blinker may be turned off. At this time, the smartphone app linked to the blinker may also be deactivated.

Effects of embodiment with the "wireless earphone with camera, smartphone voice AI, and smartphone app" are described hereafter. The camera 190 may be used to provide evidence of what happened in the event of an accident. Further, the camera 190 may be used to record the driver's commute or to capture memories of road trips. Also, the camera 190 may be used to monitor the driver's surroundings for potential threats. The safety of the driver using the blinker linked with the smartphone app may be checked by a third person, such as the driver's family, in real time through the app because the video recorded by camera 190 can be transmitted in real time. The pan-and-tilt head 191 applied to the camera 190 of the wireless earphones 180 may not only minimize the size, but also may allow the camera direction to be freely adjusted, making it possible to take pictures at various angles. Because the way or position of wearing earphones may be vary depending on a user, the pan-and-tilt head 191 can adjust the video angle required when driving the electric scooters or micro mobilities, etc.

An exemplary embodiment for attachment/detachment of camera, earphones (or dashcam earphones) and board is described as follows. According to an embodiment of the invention, the driver may detach a camera 190 and earphones 180 from the main body 100 of the earwear blinker. The camera 190 can function as a dashcam and the earphones 180 function as dashcam earphones. This can be useful when the driver wants to use the camera 190 and the earphones 180 separately from the body 100 of the wearable traffic signal device according to the present application, or when the driver wants to save space by storing the body 100 of the wearable traffic signal device in a backpack or purse. Also, according to an embodiment of the invention, an attachment/detachment port 181 may be installed on the main body of the earwear blinker and the camera 190 and the earphones 180. The port may be a small, circular opening that allows the two components to be easily connected and disconnected.

According to an embodiment of the invention, the camera 190 and the earphones 180 may be powered by a rechargeable battery, which is also the same as the battery used in the previous exemplary embodiment. Also, according to an embodiment of the invention, the attachment/detachment port 181 for the camera 190, the earphones 180, and the board 110 including LEDs may allow the driver to use the earphones 180 separately from the main body 100 when needed.

Further, according to the embodiment of the invention, a wireless module 174 for transmitting audio and video signals from the camera 190 and the earphones 180 to the smartphone may be further included. Further, the attachment/detachment port 181 for the earphones 180 may be installed on the body 100 in another embodiment of the invention. Further, programs for communication with the smartphone of the user and video recording program may be installed in the circuit board 110, and the circuit board 110 may provide electrical connections for the attachment/detachment port 181 and give instructions to the wireless module 174 and the camera 190 and the earphones 180.

Operation and functionality of an exemplary embodiment with attachment/detachment of camera, earphones (or dashcam earphone), and board are described as below. According to an embodiment of the invention, the attachment/detachment port 181 may have a plug-in port structure, which is a simple, quick-connect port that allows the two components to be easily attached and detached. Also, according to the embodiment of the invention, detaching the camera 190 and the earphones 180 from the main body 100 of the earwear blinker may allow the driver to use the earphones independently from the wearable traffic signal device. For example, the driver may use the camera 190 and the earphones 180 for recording a commute or capturing memories of a road trip. This embodiment of the invention may be used to save space by storing the board serving as the wearable traffic signal device in a backpack or purse when not in use.

Effects of an exemplary embodiment with the attachment/detachment of camera, earphones (or dashcam earphones), and board are described as follows. According to the embodiment of the invention, the driver may detach the camera 190 and earphones 180 from the main body of the earwear blinker. This can be useful in situations, such as: (a) using the camera 190 and the earphones 180 separately from the body of the wearable traffic signal device. For example, the driver may use them for recording a commute or capturing memories of a road trip; (b) saving space by storing the body of the wearable traffic signal device in a backpack or purse when not in use; and (c) providing evidence of what happened in the event of an accident.

Further, according to an embodiment of this invention, the wireless module 174 may be used to transmit audio and video signals from the wireless earphone to the smartphone. This allows the driver to: (1) view the footage from the camera 190 and earphone(s) 180 on their smartphone; and (2) control the camera 190 and earphone(s) 180 with their smartphone.

According to an embodiment of this invention, the circuit board may provide electrical connections for the attachment/detachment port 181 and may give instructions for the wireless module 174 and camera 190 and earphone(s) 180, with which the attachment/detachment port 181 may be used conveniently, and the wireless module 174 and the camera 190 may perform properly.

An exemplary embodiment with a wing-shaped, flexible LED board 210 that can be attached or detached to the main body to support the LED board of the main body is described as follows. According to an embodiment of this invention, a wing-shaped, flexible LED board 210 is an auxiliary LED board that can be attached to the center of the body 100, and thus, the flexible LED board 210 may rotate around the central axis 212, which compensates to the visibility of the LEDs 101, 211 as a traffic signal. The wing-shaped flexible board 210 according to the embodiment of this invention may be attached to the center of the body 100 or used separately. When used separately, the flexible board 210 can be attached to the helmet or other headgear of the driver. The wing-shaped flexible board 210 may include auxiliary LEDs 211, by which it may be designed to increase the visibility of the signals displayed by the blinker to other drivers approaching from behind. The auxiliary LEDs 211 may be configured to blink in the same way as the LEDs 101 on the body 100 of the earwear blinker. However, the auxiliary LEDs 211 may also be configured to blink separately from the LEDs 101 on the body 100.

According to an embodiment of this invention, the wing-shaped flexible board 210 may resemble an airplane wing for minimal wind resistance, and may measure, as an example, 50 cm in length, 20 cm in width, and 5 mm in thickness. However, the length, width and thickness are not limited thereto. Also, according to an embodiment of this invention, the wing-shaped flexible board 210 may be constructed with high-flexibility and durable silicone rubber, allowing for adhesion to the curved body as needed.

According to an embodiment of this invention, the flexible board 210 may be connected to the blinker using any type of connector which allows electronic devices to exchange data and power, for example, Universal Serial Bus (USB) connector. The USB connector may allow easy and reliable connection between the flexible board 210 and the blinker. Also, the port 213 installed on the body 100 may include a USB connector as well as about two plugs on both sides of the USB for firm connection. The port 213 can be provided more than one to allow multiple connections.

Operation and functionality of an exemplary embodiment with the wing-shaped, and flexible LED board are described as follows. The purpose of this exemplary embodiment of the invention is to prevent traffic accidents and ensure the safety of drivers with the auxiliary LEDs 211. Accordingly, the auxiliary LEDs 211 has better visibility than the body 100, allowing other drivers approaching from behind to easily recognize the driver using the auxiliary LEDs 211. According to another embodiment of this invention, if the auxiliary LEDs 211 are used separately from the body 100, it can be attached to or detachable from the driver's helmet or other headgear.

Figure 5:
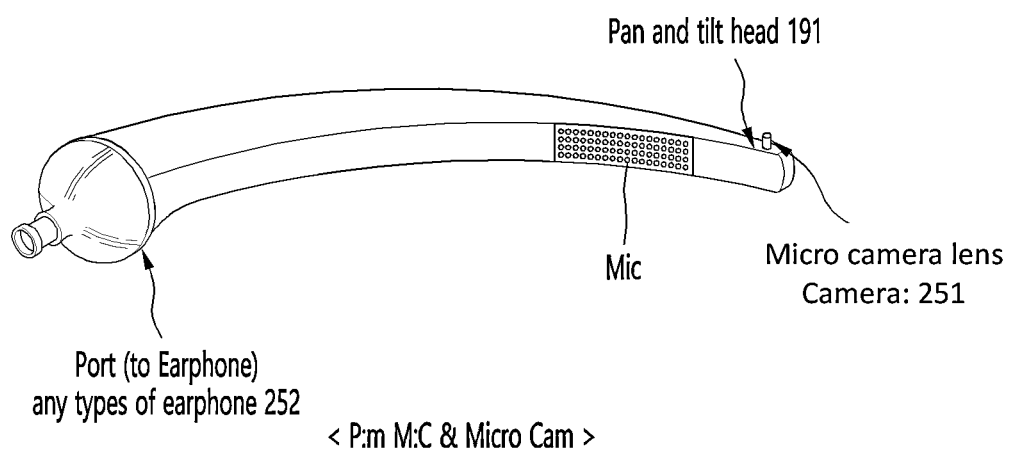
FIG. 5 shows a pin microphone and a micro camera according to an exemplary embodiment of the earwear blinker.

An exemplary embodiment with a detachable pin microphone with a camera 251 installed at an end of the pin microphone is described as follows. According to an embodiment of this invention, a microphone 250 (e.g., a detachable pin microphone with a length of about 10 cm) can be provided, wherein the microphone 250 includes a camera 251 (e.g., micro camera, spy camera, or a miniature camera) disposed at the end of the microphone such that a lens of the camera 251 secures the field of view or viewing angle, and thus, the camera 251 can function as a dashboard cam. The camera 251 may include the pan-and-tilt head 191 which allows a lens of the camera 251 to be rotated and tilted. Also, according to an embodiment of this invention, the microphone 250 can have functions of the voice detection sensors 171 and/or the microphone 170 of the wireless earphones 180. Further, the microphone 250 can be attachable to or detachable from any types of earphone(s) 252 through an earphone port shown in FIG. 5. As pin microphones transmit sound signals more accurately and clearly, they can improve voice recognition functions and improve the quality of wireless calls. The voice commands input through the microphone 250 may be recognized by the voice detector 171 such that the voice command may be operated by the earwear blinker. In this embodiment, the microphone 170 may not be provided on the body 100 of the earwear blinker.

Operation and functionality of an exemplary embodiment with the detachable pin microphone with a miniature camera installed at the end of the pin microphone are described as follows.

According to the embodiment of the invention, the camera 251 can also be used to improve the field of view of the wearable traffic signal. A camera attached to an earphone may have a limited field of view because the camera may be blocked by the wearer's face. Therefore, the microphone 250 may solve this problem by placing the camera 251 with a lens at the end of the microphone 250. This camera's structure allows the camera 251 to have a wider field of view, which can be helpful for seeing traffic conditions and preventing accidents.

According to an embodiment of this invention, the microphone 250 can also be used to improve the performance of the wearable traffic signal in noisy environments by adopting the microphone 250 which can accurately recognize traffic signal sounds even in noisy environments.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A wearable traffic signal device comprising:
   a body having a first end and a second end, the first end configured to be put on a first ear of a user and the second end configured to be put on a second ear of the user;
   wherein the body includes:
      a first plurality of light emitting diodes (LEDs) disposed on a left side, a right side and a rear side of the body;
      a circuit board disposed in the body and including a circuit configured for an operation of the wearable traffic signal device; and
      a battery disposed in the body for supplying power to the wearable traffic signal device,
   wherein:
      the body is configured to cover left, right and rear sides of a head of the user,
      each of the first end and the second end of the body has a shape configured for looping over each of the first and second ears,
      a power switch disposed at the body is connected to the circuit board and is configured to activate or deactivate the first plurality of LEDs,
      the first plurality of LEDs is configured to display a blink with a predetermined frequency level,
      when an instruction to a left direction is given, the first plurality of LEDs displays sequential blinking to the left direction and a clicking sound is generated at the body, and
      when an instruction to a right direction is given, the first plurality of LEDs displays the sequential blinking to the right direction and the clicking sound is generated at the body.

2. The wearable traffic signal device of claim 1, wherein the wearable traffic signal device further comprises a strap for adjusting a length of the body.

3. The wearable traffic signal device of claim 1, the wearable traffic signal device further comprising:
   a push button disposed at each of the first and second ends of the body and configured to be pushed or pressed by the user to activate or deactivate the first plurality of LEDs, wherein the instruction to the left direction or the instruction to the right direction is given by pushing or pressing the push button.

4. The wearable traffic signal device of claim 1, further comprising:
   an ultrasonic sensor at each of the first and second ends of the body and enabling the first plurality of LEDs to be activated or deactivated,
   wherein the instruction to the left direction or the instruction to the right direction is given by brushing the ultrasonic sensor or a periphery of the ultrasonic sensor.

5. The wearable traffic signal device of claim 1, further comprising:
   an orientation detection sensor disposed at each of the first and second ends of the body and configured to detecting a movement or a tilt of the body,
   wherein the instruction to the left direction or the instruction to the right direction is given automatically according to the movement or the tilt of the body.

6. The wearable traffic signal device of claim 1, further comprising:
   a microphone disposed at each of the first and second ends of the body and configured to receive a voice command of the user; and
   a voice detector recognizing the voice command instructing operation of the first plurality of the LEDs,
   wherein:
      when the microphone receives a left turn voice command, the left turn voice command is transmitted to the voice detector and the first plurality of LEDs sequentially blinks to the left;
      when the microphone receives a right turn voice command, the right turn voice command is transmitted to the voice detector and the first plurality of LEDs sequentially blinks to the right;
      when the microphone receives a stop voice command, the stop voice command is transmitted to the voice detector and the first plurality of LEDs displays a stop light; and
      when the microphone receives an emergency light voice command, the emergency lights voice command is transmitted to the voice detector and the first plurality of LEDs displays an emergency light.

7. The wearable traffic signal device of claim 1, further comprising:
   attachable and detachable wireless earphones disposed at the first and second ends of the body and configured to communicate with the body, wherein each of the attachable and detachable wireless earphones includes a microphone configured to receive a voice command of the user;
   a voice detector recognizing the voice command instructing the operation of the first plurality of the LEDs,
   wherein:
      when the microphone receives a left turn voice command, the left turn voice command is transmitted to the voice detector and the first plurality of LEDs sequentially blinks to the left;
      when the microphone receives a right turn voice command, the right turn voice command is transmitted to the voice detector and the first plurality of LEDs sequentially blinks to the right;
      when the microphone receives a stop voice command, the stop voice command is transmitted to the voice detector and the first plurality of LEDs displays a stop light;

when the microphone receives an emergency light voice command, the emergency light invoice is transmitted to the voice detector, and the first plurality of LEDs displays an emergency light; and the clicking sound is generated through the wireless earphones according to the voice command of the user.

8. The wearable traffic signal device of claim 7, wherein the wireless earphones are configured to be linked to a voice recognizing artificial intelligence (AI) application of a smartphone of the user, and thereby, the voice command is given by the smartphone to the wearable traffic signal device and the wearable traffic signal device operates the first plurality of LEDs according to the voice command.

9. The wearable traffic signal device of claim 8, wherein the voice command includes a power on command, a power off command, the left turn command, the right turn command, a driving command, the stop command and the emergency light command.

10. The wearable traffic signal device of claim 7, wherein the wireless earphones include a camera configured to record predetermined surroundings of the wearable traffic signal device.

11. The wearable traffic signal device of claim 10, wherein the camera includes a pan-and-tilt head allowing a lens of the camera to be rotated and tilted.

12. The wearable traffic signal device of claim 10, wherein the camera is attachable to and detachable from the wireless earphones.

13. The wearable traffic signal device of claim 1, further comprising:

a camera and earphones, wherein the camera and the earphones are attachable to or detachable from the body.

14. The wearable traffic signal device of claim 1, wherein the body further comprises a flexible LED board attachable to and detachable from the body, the flexible LED board includes a second plurality of LEDs, and the flexible LED is configured to rotate with respect to a central axis of the body.

15. The wearable traffic signal device of claim 1, wherein the body further comprises a global positioning system (GPS) receiver.

16. The wearable traffic signal device of claim 1, wherein the body further comprises a speaker.

17. The wearable traffic signal device of claim 1, further comprising: a third plurality of LEDs disposed vertically on a front-facing surface at each of the first and second ends of the body.

18. The wearable traffic signal device of claim 1, further comprising:

at least one earphone, a microphone and a camera mounted at an end of the microphone, wherein the microphone is attached at the at least one earphone.

19. The wearable traffic signal device of claim 18, wherein the camera includes a pan-and-tilt head allowing a lens of the camera to be rotated and tilted.

20. The wearable traffic signal device of claim 19, wherein the microphone is configured to receive a voice command of the user, the wearable traffic signal device further comprising:

a voice detector recognizing the voice command instructing operation of the first plurality of LEDs.

* * * * *